Feb. 15, 1955 J. L. HERSON ET AL 2,702,353

MINIATURE PRINTED CIRCUIT ELECTROSTATIC GENERATOR

Filed July 17, 1952 3 Sheets-Sheet 1

INVENTORS
SAUL R. GILFORD
JACOB L. HERSON
SACHIO SAITO

BY George Lipkin
B. L. Zangwill
ATTORNEYS

Feb. 15, 1955 J. L. HERSON ET AL 2,702,353

MINIATURE PRINTED CIRCUIT ELECTROSTATIC GENERATOR

Filed July 17, 1952 3 Sheets-Sheet 2

INVENTORS
SAUL R. GILFORD
JACOB L. HERSON
SACHIO SAITO

BY George Lipkin
B. L. Zangwill
ATTORNEYS

INVENTORS
SAUL R. GILFORD
JACOB L. HERSON
SACHIO SAITO

BY George Lipkin
B. L. Zangwill
ATTORNEYS

United States Patent Office 2,702,353
Patented Feb. 15, 1955

2,702,353

MINIATURE PRINTED CIRCUIT ELECTROSTATIC GENERATOR

Jacob L. Herson, Washington, D. C., and Saul R. Gilford, Silver Spring, and Sachio Saito, Chevy Chase, Md., assignors to the United States of America as represented by the Secretary of the Navy Application July 17, 1952, Serial No. 299,520

6 Claims. (Cl. 310—6)

(Granted under Title 35, U. S. Code (1952), sec. 266)

The invention disclosed herein may be manufactured and used by or for the Government of the United States of America for governmental purposes without the payment of any royalties thereon or therefor.

The present invention relates to an electrostatic generator of the influence type.

Electrostatic generators of the influence type generally consist of a plurality of conducting carriers on an insulating disc rotatably mounted adjacent a pair of stationary field inductors. The field inductors influence electrical charges found on the carriers by either repelling or attracting the charges, depending upon the polarity of the individual components. These charges are then transferred, by means of brushes, to a convenient charge storing device where the charges accumulate and build up the voltage potential of the storing device.

Generally, influence type electrostatic generators are utilized as a power source in insulation and capacitor testing, in alpha survey instruments, and in other applications which require a power source having a high voltage potential but a negligible current supply. Their use, however, has been limited for a number of reasons. The fabrication of the individual components and the need for insulating them necessitates the construction of large, bulky and unwieldly units suitable only for permanent installations or other installations where size can be tolerated. For generators of increasing voltage or power, the initial cost and the complexity of a unit increases. Furthermore, the dielectric strength of the air between the spaced elements in an electrostatic generator is materially affected adversely during ambient conditions of high humidity, especially when coupled with high temperatures, so that the electrostatic generator becomes unusable at even moderate potential values because of the electrical breakdown, i. e. flashover, between its electrical components at higher differences in potential. Another reason for the restricted use of electrostatic generators lies in the fact that the polarity of the individual output terminals of a generator of this type depends upon the initial charge distribution of the field inductors and their associated dielectric. Since this charge distribution may vary after each operation of the generator, with a resulting reversal of polarity upon the individual output terminals, auxiliary devices generally have to be employed to maintain the same polarity upon the output terminals at all times; the use of such auxiliary devices further increases the cost, size and complexity of a unit.

In accordance with the teachings of the present invention, a miniature electrostatic generator employing a printed electrical circuit is provided which is but a fraction of the size of former electrostatic generators. Also, through a novel and simple arrangement, incorporating asymmetrical field inductors, the individual output terminals provide a fixed polarity at all times. Furthermore, the generator is enclosed in a sealed container to minimize any effects due to any ambient conditions, and is provided with a simple but unique driving means for rotating the carrier members. Thus, the applicants provide a unique printed circuit electrostatic generator capable of producing a high potential of assured polarity in a short period of time and yet one which is simple and economical to construct.

An object of the invention is therefore the provision of an improved electrostatic generator of the influence type which is small in size, simple in construction, durable in operation and yet highly efficient to produce the desired results.

A further object of the present invention is the provision of a miniature electrostatic generator of the influence type.

Another object is to provide an electrostatic generator utilizing a printed electrical circuit.

Still another object of the present invention is the production of a predetermined and fixed polarity upon the individual output terminals of an electrostatic generator.

An object of the invention is to provide an electrostatic generator of the type described which is sealed.

A still further object is the provision of a simple and efficient driving means for a sealed miniature electrostatic generator.

Other objects and many of the attendant advantages of this invention will be readily appreciated as the same becomes better understood by reference to the following detailed description when considered in connection with the accompanying drawings drawn on various scales, wherein.

Figure 1:
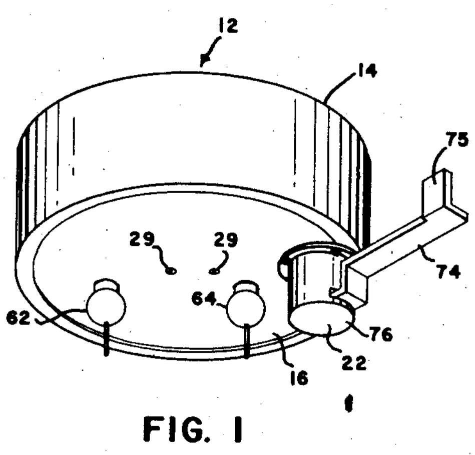
Fig. 1 is an isometric view of an electrostatic generator, embodying features of the present invention.

Referring now to the drawings, wherein like reference characters designate like or corresponding parts throughout the several views, there is shown in Fig. 1 an electrostatic generator 12, illustrating the preferred embodiment of the invention.

Figure 2:
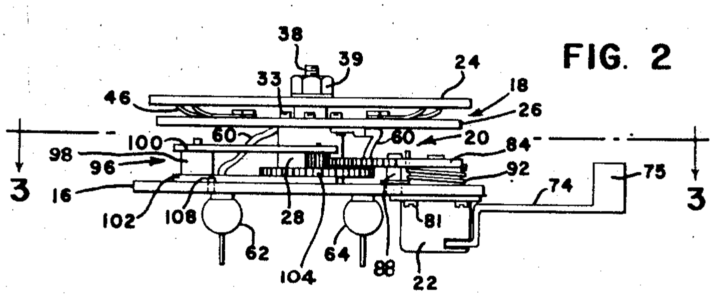
Fig. 2 is an elevational view, drawn substantially to scale, of a preferred embodiment of the invention with the cover removed.
Figure 9:
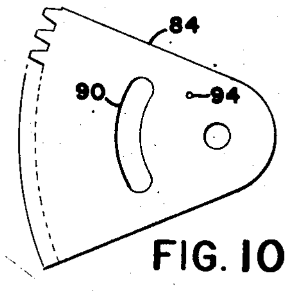
Fig. 9 is an elevational view, partly in section, of an output terminal and the carrier shaft assembly of the driving means.

As better shown in Figs. 1, 2 and 9, the electrostatic generator comprises a housing including a cover plate 14 and a base plate 16, an electrical apparatus 18 supported upon the base plate 16, a motive or driving means 20 for the electrical apparatus and a drive sealing means 22. In a manner which will hereinafter become apparent, a carrier disc of the electrical apparatus is intermittently driven in a unilateral direction, relative to a pair of field inductors, by the motive means to generate a large potential difference upon the output terminals of the generator.

The electrical apparatus 18 comprises a rotatable carrier disc 24 and a fixed field inductor plate 26 supported upon the base plate 16 in a suitable manner as by a container bearing or hollow pedestal 28 secured to the base plate 16 by means of a plurality of screws 29 passing through the base plate 16 and threaded into the bottom of the container bearing.

The container bearing 28 (Fig. 9) is provided at its upper portion with a first shoulder 30 defining a support for the inductor plate 26, and an extension 31 containing a bore 32 rotatably engaging the lower boss on the circular platform 37 later to be described. The shoulder 30 is provided with a series of threaded holes 33' angularly disposed thereabouts whereby the field inductor plate 26 is securely fastened to the container bearing by a plurality of screws 33 threaded through the matching holes in the field inductor plate.

A rotatable carrier shaft 34 inserted in the top opening of the container bearing 28 is provided at its lower end with a suitable pivot bearing 35. Integral with the carrier shaft near its upper end is the circular platform 37 having a lower and an upper boss on either side thereof. The circular platform rests upon the upper surface 31 of the lower boss, as previously mentioned, being rotatably engaged in the hose 32 in the container bearing to provide an upper bearing for the carrier shaft 34. The carrier shaft is also provided with an integral threaded portion 38 protruding beyond the circular platform 37. The upper boss of the circular platform 37 is adapted to pass through an aperture 38 located at the center of the circular carrier 24 which is secured against the upper surface of the circular platform 37 by suitable means such as a nut 39 on the threaded portion 38 extending therefrom.

Figure 4:
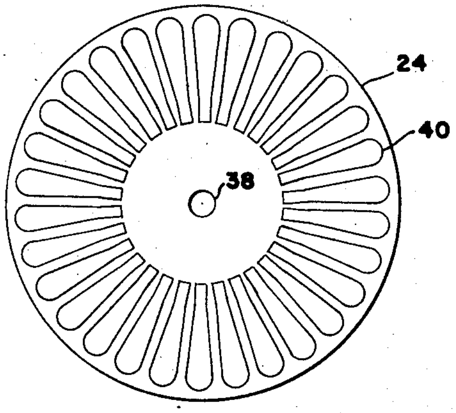
Fig. 4 is a bottom view of the carrier disc showing the construction and arrangement of the carriers.

The circular carrier disc 24, which is approximately two and one-half inches in diameter, consists of an insulating dielectric material possessing a high resistivity value such as polystyrene, and, as shown in Fig. 4, has upon its lower surface a series of thirty equal circumferentially spaced thin metallic sectors or carriers 40 formed in the shape of streamline or tear-drop members, each insulated from the others. These tear-drop-shaped conducting carriers 40 are formed on the surface of the carrier disc 24 by any suitable printed circuit technique such as the photo acid-etch process wherein a sheet of copper is bonded to a sheet of polystyrene and the undesired copper etched away by acid to provide the insulated carriers. This use of a printed circuit carrier plate provides a simple and economical means for forming the carriers upon the plate by eliminating the need for independently fabricated carriers separately secured to an insulating backing disc. This novel printed disc 24 also is smaller than one which must be assembled.

Figure 5:
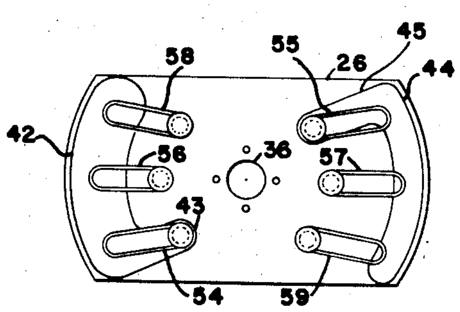
Fig. 5 is a plan view of the field inductor plate showing the construction and arrangement of the field inductors and the electrical brushes.

As previously mentioned, the field inductor plate 26 is secured to the container bearing 28 in close proximity to the carrier disc 24, the hole 36 fitting over the extension 31 thereon, and the field inductor plate 26 is composed of a suitable insulating material such as polystyrene. As illustrated in Fig. 5, the field inductor plate 26, which is an elongated member having its ends curved in an arc, has upon the ends of its upper side a pair of coplanar copper field inductors 42 and 44 which face the coplanar carriers 40 which are on the under side of the carrier disc 24. The planes containing the inductors 42 and 44, and the carriers 40 are parallel, and are spaced as closely as practical to provide a high degree of induction between the inductors and the carriers, but not so close as to cause objectionable flashover between the carriers and the inductors. The inductors 42 and 44 are applied to the surface of the field inductor plate 26 by the printed circuit technique of the photo acid-etch process similar to the manner in which the carriers 40 were applied to the carrier disc 24.

Figure 6:
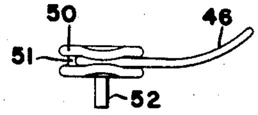
Fig. 6 is a greatly enlarged elevational view of a contact brush and its support.
Figure 7:
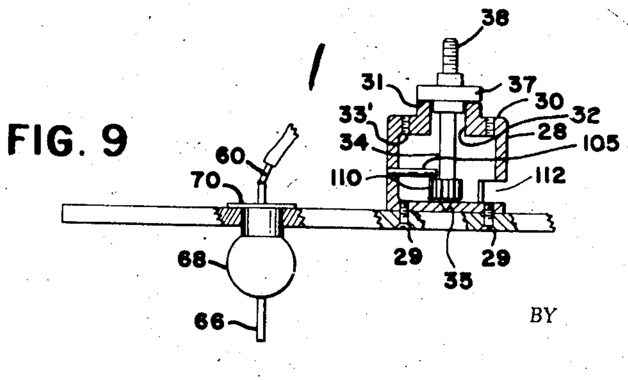
Fig. 7 is a plan view of the brush and its support.

As shown in Fig. 5, each of the field inductors 42 and 44 extends over an arc of approximately 90° and each has a radial arm 43 and 45, respectively protruding therefrom, to which a metallic brush is attached. The field inductors 42 and 44 are somewhat similar in shape but are asymmetrical in that the field inductor 44 is much narrower and thus covers a smaller area of the dielectric backing than its oppositely disposed field inductor 42. Fixedly mounted adjacent the field inductors 42 and 44 as subsequently described, is a series of three pairs of electrical contact brushes 46 which are adapted to engage the individual carriers 40 of the carrier plate 24 while the carriers are rotated. As better shown in Figs. 2, 5, 6 and 7, each of the electrical brushes 46 comprises a U-shaped relatively stiff contact brush formed of a material such as piano wire, and a brush holder 48 for the contact brush. The brush holder 48, which consists of a highly conductive material such as copper, includes a circular head 50 having a groove 51 located upon its circumference midway between its top and bottom portions and a stem 52 extending below the center of the bottom portion. Each contact brush is secured to its brush holder 48 with the ends of its legs within the groove 51 of the head 50. The leg-ends are bent slightly inward and the head then deformed by pressing a part of its edges to hold the brush in position as shown in Figs. 6 and 7. The arrangement produces a loop or U-shaped brush having its bow bent upward to provide a firm but resilient contact with the carriers. The brushes are secured to the field inductor plate 26 by inserting the stem within an aperture formed within the plate 26 and peening the outer end of the stem.

The three sets of electrical brushes include a pair of field brushes 54 and 55, a pair of output brushes 56 and 57, and a pair of polarizing brushes 58 and 59. The field brushes 54 and 55 are electrically connected to the field inductors 42 and 44 respectively through its brush holder 48 and the extended arms 43 and 45 of the field inductors. Polarizing brushes 58 and 59 are shorted out between themselves by an electrical jumper line 59′ (not shown in Fig. 2) extending from one polarizing brush to the other, while the output brushes 56 and 57 are connected by means of electrical conductors 60 to a pair of output terminals 62 and 64 located in the base plate 16. As indicated in Fig. 9, each output terminal, which functions to provide a convenient outlet for the generated voltages, includes a feed-through line 66 connected to the output brushes by line 60, a spherical insulating member 68 for the feed through line, and an insulator support 70 tightly fitted against the base plate 16 to provide a hermetically sealed joint.

The theory of operation of an influence type electrostatic generator, such as described above, manifests itself in a simple manner as follows: If a first conducting body, charged positively, is brought into close proximity to a second conducting body, there will be produced on the second body a distribution of negative and positive charges, the negative charges being on the point of the second body, which is closest to the first body and the positive charges on the part farthest from the first body. If the second body is then grounded or connected to an output load, the positive charges of the second body will be removed by the repelling action of the positively charged first body. Then the second body will be negatively charged because the negative charges remain on the second body even after the first body is removed from the vicinity of the second body.

Figure 12:
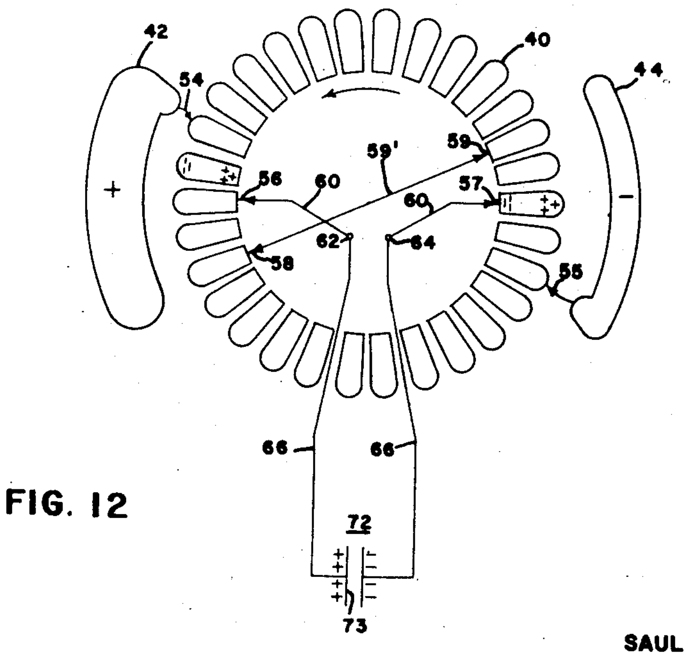
Fig. 12 is a diagrammatic circuit diagram of a typical electrical apparatus embodying features of the present invention and in which the field inductors and the carrier plates are shown in the same plane for clarity in the explanation of the device.

Referring to Fig. 12 the series of carriers or sectors 40 are shown as lying in the same plane as the pair of field inductors 42 and 44 for purposes of clarity in explanation; while the contact brushes are illustrated for simplicity by way of arrow heads. As clearly shown, the brushes are connected to their respective elements in that field brushes 54 and 55 are connected to their respective field inductors, the polarizing brushes 58 and 59 have interposed between themselves a shorting line 59′ and the output brushes 56 and 57 have inserted, as a load in their output line, a large capacitor or suitable load 72. It is to be understood that the field inductors 42 and 44 and the various contact brushes 54, 55, 56, 57, 58 and 59 are stationary, and that the carriers or sectors 40 rotate.

The regenerative process of voltage build-up across the capacitor 72 begins with a small initial potential difference between the field inductors 42 and 44 due to dielectric polarization, contact potential or some such phenomenon. Normally with a pair of symmetrically shaped field inductors, the potential difference will depend upon the initial distribution of charges upon the field inductors. Since this initial distribution of charges may vary between the two field inductors, the output polarity of the generator at the output terminals will vary accordingly. This variation of the output terminal polarity has been a constant source of irritation and inconvenience which usually necessitated the use of additional equipment to obtain a predetermined polarity at each of the terminals. However, in the present invention, by constructing asymmetrical field inductors whereby inductor 42 covers a larger area of the polystyrene than the field inductor 44, a predetermined polarity will be obtained at each of the output terminals. In such a case, the output terminal 62 associated with the larger of the two field inductors will have a positive polarity while the output terminal associated with the smaller of the field inductors, which thereby exposes a larger area of the polystyrene dielectric, will have a negative polarity.

The polarity of the electrostatic generator depends at least in part on the insulation material for the field inductor plate 26. Where polystyrene is used, the smaller plate 44 is connected to the negative terminal.

For the purposes of illustration, the field inductor 42 will have a small initial positive charge and assuming that the direction of the carrier plate 24 is in a counter-clockwise direction as indicated by an arrow in Fig. 12, each carrier 40 after breaking contact with the field brush 54 will become polarized by induction by the positively charged field inductor 42, as indicated by the lefthand carrier 40 of Fig. 12. While still under the influence of the field inductor 42, this lefthand carrier, upon contacting the output brush 56, will have the positive charge removed to a plate 73 of the capacitor 72 by the repelling action of the positively charged field inductor 42. The carrier which is now negatively charged since its positive charges were removed will then leave the area influenced by the positively charged field inductor 42, and ultimately will contact the field brush 55. When this happens it will impart most of its negative charge through the brush 55 to the field inductor 44, rendering the field inductor 44 more negative. On leaving the brush 57, this carrier 40 will now become positively polarized by the negative charged field inductor 44, and gives this charge up to the positive field inductor 42 when it again contacts brush 54. Each carrier 40 undergoes this process, and the potential on the field inductors thus quickly builds up to a high value. The process continues as long as the voltage across the storage capacitor 72 remains lower than the potential difference between the field inductors and a breakdown of the dielectric does not occur somewhere in the unit.

It is noted that there is no mention in the above described operation of the generator of the polarizing brushes 58 and 59. They have little or no effect, except for introducing some power loss in the unit, during the starting and potential build-up period and during the actual operation of the electrostatic generator. However, the brushes 58 and 59 come into action after the electrostatic generator has charged a storage capacitor to a high potential and is then stopped. During such a stationary period, without these brushes, the potential difference between the field inductors might, through leakage or otherwise, drop below the voltage across the storage capacitor, and if the generator is restarted the potentials on the inductors might be forcibly reversed.

The polarizing brushes 58 and 59 are introduced to prevent this reversal of polarity. When the capacitor 72 presents a higher voltage than the potential difference found upon the inductor plates, any charges on a carrier 40, which has a like sign as the field inductor influencing the carrier at the moment, will be repelled to the diametrically opposite carrier through the shorting line 59'. In this way, the charges from the two carriers, having the same sign in their respective inductors at that instant then tend to neutralize each other. In the meantime, the field inductors will hold the charges of the opposite polarity such that the carriers upon passing the polarizing brushes and the field of the inductors will possess the proper charge and therefore build up the potential of the opposite inductor in the proper direction. In so doing, the polarizing brushes serve to maintain the same polarity upon the field inductors at all times and also prevent the capacitor from becoming completely discharged.

An electrostatic generator, incorporating features of the present invention and having a carrier disc of approximately two and one-half inches in diameter, charged a .01 microfarad condenser to 2100 volts in approximately 100 revolutions of the carrier disc, which revolutions represent four to six seconds of operation. This rate of buildup may be increased by revolving the carrier disc faster, increasing the number of carrier pairs, or by increasing the size of the carriers and the field plates. In the embodiment disclosed, a maximum voltage of approximately 6000 volts has been obtained, prior to breakdown due to flashover between the conductors, by increasing the number of revolutions of the carrier disc.

Figure 3:
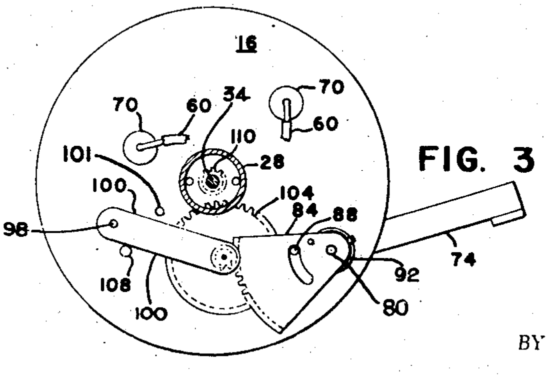
Fig. 3 is a cross sectional view of the driving means taken on the line 3—3 of Fig. 2.
Figure 10:
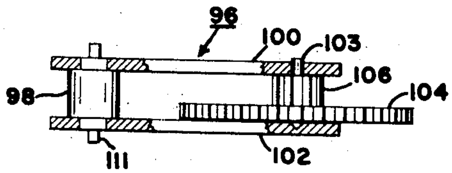
Fig. 10 is a plan view of a sector gear of the driving means.
Figure 11:
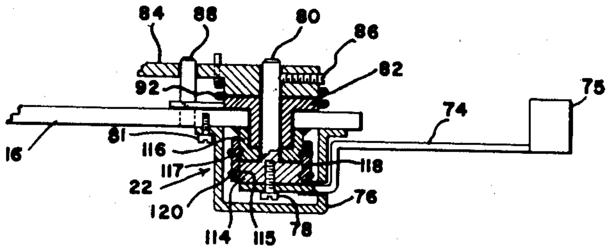
Fig. 11 is a partial elevational view, partly in section, of the driving mechanism and the sealing means therefor.

In order to revolve the carrier disc relative to the field inductor plates, a unidirectional reciprocating to rotary driving mechanism is employed which is associated with the drive sealing means 22. The driving mechanism comprises an operating lever 74 which extends beyond the base plate 16 and has a turned-up extension providing a hand grip 75 for the operator. As indicated in Fig. 11 the sealing means 22 comprises a protective cover 76 having a hole elongated through which the inner end of the hand lever passes. A threaded screw 78 is passed through an aperture provided within the inner portion of the hand lever to enter a threaded hole located in the end of a drive shaft 80 whereby the hand lever 74 is firmly attached to the drive shaft. This drive shaft 80 is rotatably mounted in a bushing 82 securely fastened to the base 16 by any suitable means and extends upwardly beyond the drive bushing. A sector or drive gear 84 is attached to the protruding end of the drive shaft 80 by means of a locking screw 86 inserted within aligned openings in the shaft and the drive gear. As shown in Figs. 3 and 10, sector gear 84 extends in an arc of approximately 45° and is controlled in its rotary movement by a stop pin 88 secured to the base plate 16, the stop pin 88 slidably engaging a narrow arc shaped guide slot 90 formed in the sector gear. Thus, the stop pin acts to limit the extent of movement of the sector gear. Coiled around a boss formed on the sector gear 84 and serving to bias the sector gear toward its unactuated position is a return spring 92 having one end secured to the guide pin 88 and the other end locked in an aperture 94 in the sector gear.

Figure 8:
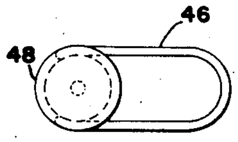
Fig. 8 is an elevational view, partly in section, of a gearing assembly of the driving means.

As indicated in Figs. 2, 3 and 8, a gearing assembly 96 is associated with the sector 84 for conveying rotating power from the sector 84 to the carrier plates 24. The gearing assembly 96 comprises a spacer pivot 98, and spacing arms 100 and 102 parallel to each other; the arms 100 and 102 being rotatable on the base 16 with the pivot 98. A shaft 103 is rotatably carried by the arms 100 and 102, and has fastened thereto a large gear 104 and a small pinion gear 106 which is adapted to swing into and out of mesh with a carrier drive pinion 110 (Fig. 3) on the shaft 34 so as to rotate the plate 24 carried by the shaft 34. To this end, the spacer pivot 98 has a stud end 111 projecting from the bottom arm 102 into a fitting aperture in the base plate 16 and in which it can rotate in either direction, carrying with it the arms 100 and 102 and therefore the gears 104 and 106.

The pivoting gearing assembly 96 acts between a stop pin 108 (Figs. 2 and 3) secured to the base plate 16 and the carrier drive pinion 110 attached to the carrier shaft 34 within the container bearing 28. The container bearing has a slotted portion 112 in the lower portion thereof to permit the entrance of the gear 106 for rotating the carrier pinion 110.

In operation, reciprocation of the hand lever 74 will rotate, against the bias of spring 92, the drive or sector gear 84 through the drive shaft 80. The drive gear will, in turn, rotate the pinion gear 106 and large gear 104 and, at the same time, apply a counter-clockwise force to the gearing assembly 96, thereby rotating the gearing assembly until the large gear 104 engages the carrier pinion 110 on the carrier shaft 34. The rotating gear 104 revolves the carrier shaft 34 and the carrier disc 24 attached to the carrier shaft through the carrier pinion 110. As the carrier pinion 110 rotates, reactionary forces are set up tending to force the gearing assembly 96 out of mesh with the gear 110. This force, however, is less than the counter-clockwise force being applied to the gearing assembly 96 by the sector gear 84 so that the large gear 104 continues to engage the carrier pinion 110. Upon reaching its full limit of travel, the sector gear 84 no longer applies a force to the gearing assembly 96 but since the carrier shaft 34 and the carrier disc 24 are still rotating, the reactionary clockwise forces exerted by them are now sufficient to rotate the gearing assembly away from the carrier pinion whereby the large gear 104 ceases to mesh with the carrier pinion. Therefore, the carrier shaft 34 will continue to rotate, due to its momentum, after the large gear 104 disengages from it. In the meantime, the return spring 92 returns the sector gear 84 to its original position whence the action may be continuously repeated by operation of the lever 74 until the desired voltage is obtained across the capacitor 72 interposed in the output circuit of the electrostatic generator.

Since the air dielectric value depends largely upon the ambient conditions at that time, the ambient conditions determine the operating characteristics of the electrostatic generator. In instances of extreme humidity, especially when coupled with relatively high temperatures, electrical breakdown occurs at even relatively moderate potential values due to the lowering of the air dielectric. To insure reliable operation of the generator, this invention hermetically seals the operating parts of the generator.

Fig. 11 illustrates the manner of hermetically sealing the interior of the casing from any atmospheric conditions which may enter the casing by way of the drive shaft 80. At the extreme outer end of the drive shaft 80 and integral therewith is a first circular seal support 114 having a groove 115 cut upon its circumference. A second tubular seal support 116 having an outer diameter approximately equal to the first seal support 114 is hermetically sealed and secured to the base plate 16 by welding or otherwise, and positioned with its outer surface adjacent the outer surface of the first seal support. The second seal support 116 includes an upper portion with an inner bore engaging the drive bushing 82, a second lower portion having a bore which accommodates the drive shaft 80, and a circular groove 117 cut upon its outer surface completely encircling it. A tubular seal 118 of resilient material is slipped over the first and the second seal supports and fastened into place by a pair of lock rings 120 which rings are adapted to force the resilient material within the grooves 115 and 117 formed in the seal supports, and thus hermetically seal the interior of the casing. In action, upon movement of the drive shaft the tubular seal 118 is sufficiently resilient to allow unrestricted reciprocating movement of the lever 74 and its associated parts. Additional protection is provided by the protective cover 76 which is secured to the base plate 16 by fastening screws 81 and acts to protect the seal from physical harm. The cover plate 12 seals the entire unit except for the drive shaft, by a close fit with the base plate 16, the edges of the cover plate 12 being peened over the edge of the base plate 12 to 16 to provide a seal against moisture, and a gasket may be provided if desired.

Thus, it can be seen from the above that the applicants have provided an improved electrostatic generator of the influence type, which produces a predetermined polarity upon its output terminals, is miniature in size, simple and economical in construction and efficient in operation.

It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be protected by Letters Patent of the United States is:

1. In an electrostatic generator of the influence type, the combination of a circuar rotatable polystyrene disc, a plurality of tear-drop shape conducting carriers printed upon said disc, an elongated stationary polystyrene inductor plate positioned adjacent said rotatable disc, a first conducting inductor printed upon one end of said inductor plate adjacent a first series of said carriers, a second coplanar conducting inductor printed upon the opposite end of said inductor plate adjacent a second series of said carriers, said second inductor having an area much less than the area of said first inductor, a first plurality of electrical brushes secured to said polystyrene inductor plate adjacent said first inductor and adapted to engage respective ones of said carriers, a second plurality of electrical brushes secured to said polystyrene inductor plate adjacent said second inductor diametrically opposite said first plurality of electrical brushes and adapted to engage others of said carriers, means connecting one of said first plurality of electrical brushes to said first inductor and a diametrically opposed one of said second plurality of electrical brushes to said second inductor, means connecting another of said first plurality of electrical brushes to a diametrically opposite one of said second plurality of brushes, whereby the remaining brush in said first plurality of electrical brushes is positively charged with respect to the remaining brush in said second plurality of brushes.

2. An electrical brush comprising a U-shaped resilient contact brush and a brush support including a circular head and a stem, said head having a circular groove cut upon its outer circumference which groove is operative to receive the ends of the U-shaped contact brush to secure the contact brush to said head.

3. An influence type electrostatic generator including in combination a hermetically sealed housing comprising a base plate and a cover cap, a rotatable carrier disk having a plurality of carriers thereon, a stationary field inductor plate having a pair of asymmetrical field inductors and a series of electrical brushes thereon, said disk and said plate being supported upon said base plate, a driving mechanism for said rotatable carrier disk secured to said base plate, and a drive sealing means for said drive mechanism comprising a tubular seal support secured to said base plate, a circular seal support integral with a drive shaft of the driving mechanism, said circular seal support having its outer circumference lying in the same plane as the outer circumference of said tubular seal support and a resilient tubular seal secured to said circular seal support and said tubular seal support.

4. In a miniature electrostatic generator, the combination of a hermetically sealed casing comprising a base plate and a cover cap, a rotatable carrier disk carrying a plurality of conducting carriers supported upon said base plate by a carrier shaft, a stationary field inductor carrier plate carrying a pair of asymmetrical field inductors and a plurality of electrical brushes thereon supported from said base plate adjacent said carrier disk, said electrical brushes being operative to contact said carriers and each comprising a U-shaped resilient contact brush supported upon a deformed head portion of the electrical brush and a securing stem attached to the head portion and secured to the base plate, a driving means for said rotatable carrier disk, and a drive seal for said drive means.

5. In a miniature electrostatic generator, the combination of a hermetically sealed casing comprising a base plate and a cover cap, a rotatable carrier disk having a plurality of conductive carriers secured thereon supported upon said base plate by a carrier shaft, a stationary field inductor carrier plate, a pair of asymmetrical field inductors, and a plurality of electrical brushes supported upon said base plate adjacent said carrier disk, said electrical brushes being operative to contact said carriers, a drive means for said rotatable carrier disk, and a drive seal comprising a tubular sealed support, a circular seal support, a groove cut upon the circumference of each outside tubular and circular seal support, a resilient tubular seal on said seal supports, and a pair of locked rings adapted to force said resilient tubular seal into said grooves, whereby the drive mechanism is hermetically sealed.

6. An influence-type high-voltage electrostatic generator comprising a casing having a dished cover plate and a base plate, a hollow pedestal centrally mounted on said base plate, said pedestal having a shoulder in a side away from said base plate and toward said cover plate, a rotatable shaft journaled on the cover-plate side of said base plate and in said pedestal, said shaft extending beyond said shoulder, a pair of spaced co-axial generating discs, a first of said discs being secured to said shoulder, and the other to said shaft, gearing on said base plate on a level between said shoulder and said base plate, said gearing being connected to said shaft, said cover plate covering said gearing, discs and pedestals, and manually-operated means extending partially outside said casing for operating said gearing.

References Cited in the file of this patent

UNITED STATES PATENTS

| | | |
|---|---|---|
| 324,010 | Clarke | Aug. 11, 1885 |
| 638,194 | Arnold | Nov. 28, 1899 |
| 779,190 | Thomson | Jan. 3, 1905 |
| 1,909,079 | Steerup | May 16, 1933 |
| 2,577,446 | Bosch | Dec. 4, 1951 |
| 2,610,994 | Bosch et al. | Sept. 16, 1952 |

FOREIGN PATENTS

| | | |
|---|---|---|
| 647,573 | Great Britain | Dec. 13, 1950 |